Sept. 18, 1923.
C. S. FRANGOS
1,468,499
MOTION PICTURE MACHINE
Filed May 5, 1922
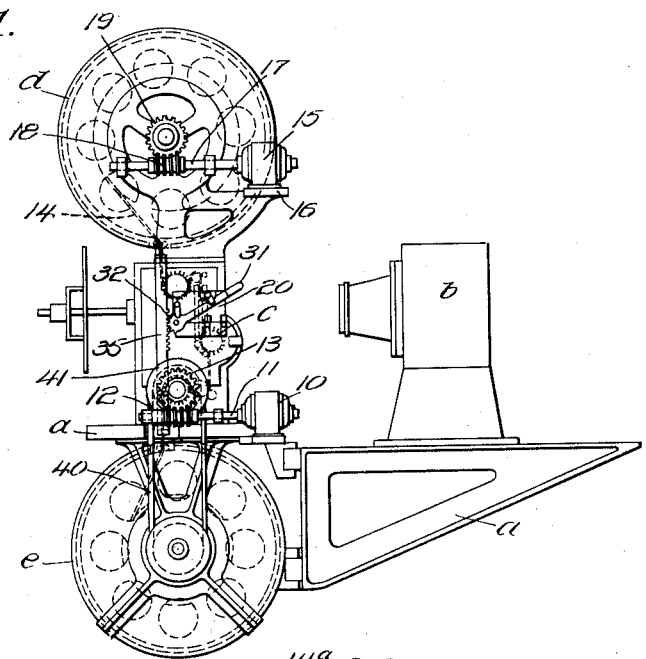
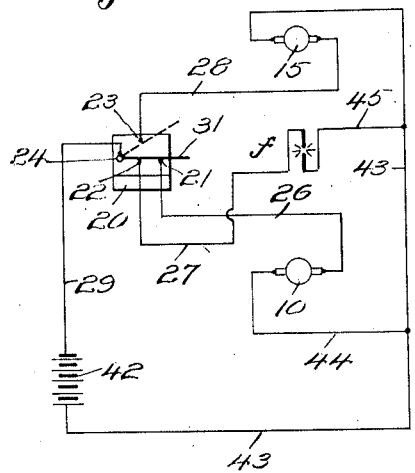
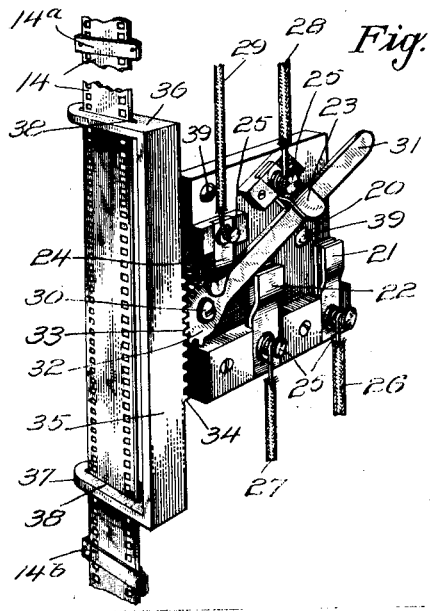
INVENTOR.
Charles S. Frangos.
BY
Geo. F. Kimmel
ATTORNEY.

Patented Sept. 18, 1923.

1,468,499

UNITED STATES PATENT OFFICE.

CHARLES S. FRANGOS, OF NEWARK, NEW JERSEY.

MOTION-PICTURE MACHINE.

Application filed May 5, 1922. Serial No. 558,731.

*To all whom it may concern:*

Be it known that I, CHARLES S. FRANGOS, a subject of the King of Greece, residing at Newark, in the county of Essex and State of New Jersey, have invented certain new and useful Improvements in Motion-Picture Machines, of which the following is a specification.

This invention appertains to certain improvements in motion picture machines generally, and has for its principal object to provide, in combination, a motion picture machine and a means for effecting the automatic operation of the machine for the projection on the pictures of a film therefrom, and for the rewinding of the film back into position for successive and repeat projecting operations.

Another object of the invention is to provide for a means as hereinbefore characterized, and one embodying an electric control switch mechanism to be automatically actuated by the film in its winding movements from one reel to another of a pair of such reels forming a part of the ordinary equipment of the motion picture machine.

A further object of the invention is to provide for a means of the class set forth, and one of a comparatively inexpensive and durable construction, exceedingly simple in arrangement, automatic and efficient in operation, and of a nature to be readily and quickly installed on known types of motion picture machines.

With the foregoing and other equally important objects in view, the invention resides in the certain new and useful construction and arrangement of parts, as will be hereinafter more fully described, set forth in the appended claims, and illustrated in the accompanying drawing, in which:—

Figure 1 is a side elevation of a conventional form of motion picture machine, and showing the preferred embodiment of the invention as installed thereon, Fig. 2 is a perspective view of the control means per se, and showing the manner of the cooperation therewith of the picture film, and, Fig. 3 is a diagrammatical view of the device as connected in circuit with the operating motors of the picture machine at the lamp circuit of the latter.

Referring to the drawing, and more particularly to Fig. 1 thereof, the letter *a* denotes a supporting base, *b* a lamp housing, *c* a film feed mechanism, *d* an upper film reel receiving housing, and *e* a lower film reel receiving housing, all forming parts of a conventional form of motion picture machine.

For operating the feed mechanism *c* of the motion picture machine, the present invention contemplates the mounting of an electric motor 10 on the forward part of the base *a*, directly in rear and to one side of the feed mechanism *c*, with its forwardly projecting motor shaft 11 provided with a worm gear 12 arranged in mesh with a worm wheel 13 mounted on the drive shaft of the said feed mechanism for the purpose, when, upon the starting up of the motor 10, the film 14 will be fed downwardly through the feed mechanism *c* and wound upon the reel housed within the lower housing *e*. It is also contemplated to effect the rewinding of the film 14 back onto the reel within the upper housing *d* from the reel within the lower housing *e* for the successive and repeat projections of the pictures or other matter thereon, and this is readily accomplished by mounting a second electric motor 15 on a bracket 16 at one side of the upper reel housing *d* and providing the motor shaft 17 with a worm gear 18 arranged in mesh with a worm wheel 19 for rotating the upper reel in the proper direction on its axis.

To render the operation of the machine automatic, an electric switching device is mounted exteriorly of and at one side of the encasement of the feed mechanism *c*, and is arranged to be actuated by the film 14 at the end of each of its opposite directions of movement through the latter, whereby to correspondingly control the motors 10 and 15 for the downward feed of the film 14 for the projection of the pictures or other matter therefrom, and for the rewinding of the same upwardly of the mechanism *c* respectively for repeat projecting operations, the switch also operating to cut the lighting medium *f* into circuit simultaneously with the starting up of the motor 10, and to cut the lighting medium *f* out of circuit similarly with the stopping of the motor 10 and the starting up of the motor 15.

As shown in Fig. 2, this switch device comprises a base 20 having arranged inwardly of its lower edge a pair of spaced resilient contacts 21 and 22, one insulated from the other, and inwardly of its upper edge, a pair of angularly disposed and resilient contacts 23 and 24, each of the several contacts 21, 22, 23 and 24 having a binding post 25 for the reception of circuit leads 26, 27, 28 and 29, respectively. Pivoted on the outer face of the base, immediately adjacent one of the vertical edges thereof and on a pivot pin 30, is a switch blade 31, which has its pivoted end formed to provide a substantially circular enlarged portion 32 with the peripheral edge thereof toothed as at 33 for meshing engagment with the toothed edge 34 of a rack bar 35. The upper and lower end portions 36 and 37 of the rack bar 35 are bent at right angles to one side thereof and are each slotted as at 38, in the longitudinal directions of the same, whereby the slots are alined one with respect to the other.

This switching mechanism is to be mounted in position at one side of the encasement of the feed mechanism c, substantially as is shown in Fig. 1, wherein the switch base 20 is fastended in position by means of screw or the like 39, with the rack bar 35 disposed in mesh with the toothed end 32 of the switch blade 31, and with its upper and lower angularly bent portions 36 and 37 disposed in overlying and underlying relation respectively to the top and bottom walls of the feed mechanism encasement and with the slots 38 thereof in alinement with the film slots of the latter.

In the operation of a motion picture machine as constructed and arranged in accordance with the present invention, a filled film reel is placed within the upper housing d and the free end of the film 14 is threaded downwardly therefrom through the slot 38 of the upper end member 36 of the rack bar 35, thence through the encasement d and the feed mechanism therein outwardly of the bottom of the latter and through the slot 38 of the end portion 37 of the rack bar 35, and from thence into the lower housing e, where it is attached to a winding reel mounted therein and driven by means of a belt connection 40 from a pulley 41 associated with the worm wheel 13. Inwardly of the opposite ends of the film 14, the same is provided with pairs of oppositely disposed projections 14ª and 14ᵇ, which cooperate with the respective end portions 36 and 37 of the rack bar 35 to operate the switch blade 31 correspondingly with the directions of movement of the film 14. The motors 10 and 15 are connected in circuit with the control switch 20, substantially as is shown in Fig. 3, and, as follows:—From a suitable source of current supply 42, a conductor 29 leads to and connects the binding post 25 of the contact 24, which remains in contact with the switch blade 31 at all times, while a second conductor 43 leads from the battery 42 to and connects one brush of the motor 15, and is also connected by conductors 44 and 45 branching therefrom to one brush of the motor 10 and one terminal of the lighting medium f. A conductor 26 leads from the opposite brush of the motor 10 and connects the binding post 25 of the contact 21 of the switch, while a conductor 27 leads from the binding post 25 of the contact 22, and leads to and connects the other terminal of the lighting medium f, the other contact 23 of the switch 20 having a conductor 28 leading from its binding post 25 to and connecting the opposite brush of the motor 15. Now, with the switch blade 31 in the position as shown in full lines in Fig. 3, current will flow from battery 42, by conductor 29 to switch contact 24, by switch blade 31 to contact 21, by conductor 26 to motor 10, by conductor 44 to conductor 43 back to battery. Current will now also flow from switch blade 31 to contact 22, by conductor 27 to lighting medium f, by conductors 45 and 43 back to battery. Upon the starting up of the motor 10, the film 14 will be fed downwardly through the feed mechanism c, and at the limit of its downward movement, the projections 14ª thereof will strike the upper member 36 of the rack bar 35 and pull down on the same, which action swings the switch blade 31 out of contact with the contacts 21 and 22 and into engagement with the upper contact 23, when the circuit will be broken to the motor 10 and the lighting medium f. Current will now flow from battery 42, by conductor 29 to contact 24, by switch blade 31 to contact 23, by conductor 28 to motor 15 and from motor 15 by conductor 43 back to battery 42. The motor 15 will now be started up, and will operate to rewind the film 14 from the lower reel housing e to the upper reel housing d. Near the end of the upward travel of the film 14, the lower set of projections 14ᵇ thereof will strike the lower member 37 of the rack bar 35, causing the switch blade 31 to swing out of contact with the contact 23 and again close the circuit through the contacts 21 and 22 to the motor 10 and the lighting medium f for a repeat projecting operation of the pictures or other matter on the film 14. The projections 14ª and 14ᵇ are preferably in the form of metal clips or pairs of flat strips arranged to be clamped at the opposite side of the film strip 14 at any desired positions thereon suitable for the intended purposes thereof.

From the foregoing, it will be readily apparent that, while a preferred embodiment of the electric control mechanism has been described and illustrated herein in specific terms and details of construction, arrangement and operation, various changes in and modifications of the same may be resorted to without departing from the spirit of the invention, or the scope of the claims appended hereto.

Having thus described the invention, what is claimed as new, is:—

1. In a motion picture machine, the combination with upper and lower film reels and a film feed mechanism interposed therebetween and including the light medium of the machine, of an electric motor for operating said film feed mechanism for the feeding of the film from the upper reel to the lower reel, a second electric motor for operating the upper reel for the rewinding of the film thereon, a switching device having contacts connected to said electric motors and to the lighting medium, a switch blade pivoted at one end and operable between said contacts and having its pivoted end toothed, a rack bar in mesh with the toothed end of said switch blade, and projections attached at the opposite end portions of the film and adapted to operate said rack bar correspondingly with the opposite directioned movements of the film to and from the upper of the reels to shift said blade relative to said contacts to control the operation of said motors and the light medium.

2. In a projection machine for motion pictures a pair of film winding elements for alternately shifting the films in opposite directions, an electric lamp illuminable on the operation of one of said elements, electrically driven means for alternately operating said elements, a switching device having contacts in circuit with said means and said lamp and further including a pivoted circuit opening and closing blade cooperating with said contacts and having one end toothed, a shiftable rack bar permanently in mesh with the toothed end of said blade, and projections carried by the film and engaging with said bar for alternately shifting it in opposite directions to correspondingly shift the blade to provide for the alternate operation of said elements and the illumination of said lamp on the operation of one of said elements.

3. In a projection machine for motion pictures a pair of film winding elements for alternately shifting the film in opposite directions, a film feeding mechanism interposed between said elements and including an electrical lamp illuminable on the operation of one of said elements, electrically driven means for alternately operating said elements, a switching device carried by said mechanism and having contacts in circuit with said means and lamp and further including a pivoted circuit opening and closing blade cooperating with said contacts and having one end toothed, a shiftable rack bar supported by said mechanism and through which passes a film and further permanently in mesh with the toothed end of said blade, and projections carried by the film and engaging with said bar for alternately shifting it in opposite directions to correspondingly shift the blade to cooperate with the contacts to provide for the alternate operation of said elements and the illumination of the lamp on the operation of one of said elements.

4. In a projection machine for motion pictures a pair of film winding elements for alternately shifting the film in opposite directions, an electric motor associated with each of said elements and provided with an operative drive connection therebetween and its associated element, a film feeding mechanism interposed between said elements and including an electric lamp illuminable on the operation of one of said elements, a switching device carried by said mechanism and having contacts in circuit with said motors and said lamp and further including a pivoted circuit opening and closing blade cooperating with said contacts and having one end toothed, a shiftable rack bar supported by said mechanism and through which passes the film, said bar permanently in mesh with the toothed end of said blade, and projections carried by the film and engaging with said bar for alternately shifting it in opposite directions to correspondingly shift the blade to cooperate with the contacts to provide for the alternate operation of said elements and for the illumination of the lamp on the operation of one of said elements.

In testimony whereof, I affix my signature hereto.

CHARLES S. FRANGOS.